Nov. 2, 1965 ASAO OISHI 3,215,155
SPEED GOVERNOR DEVICE HAVING PILOT VALVE STATIC
FRICTION PREVENTION MEANS
Filed Feb. 25, 1963
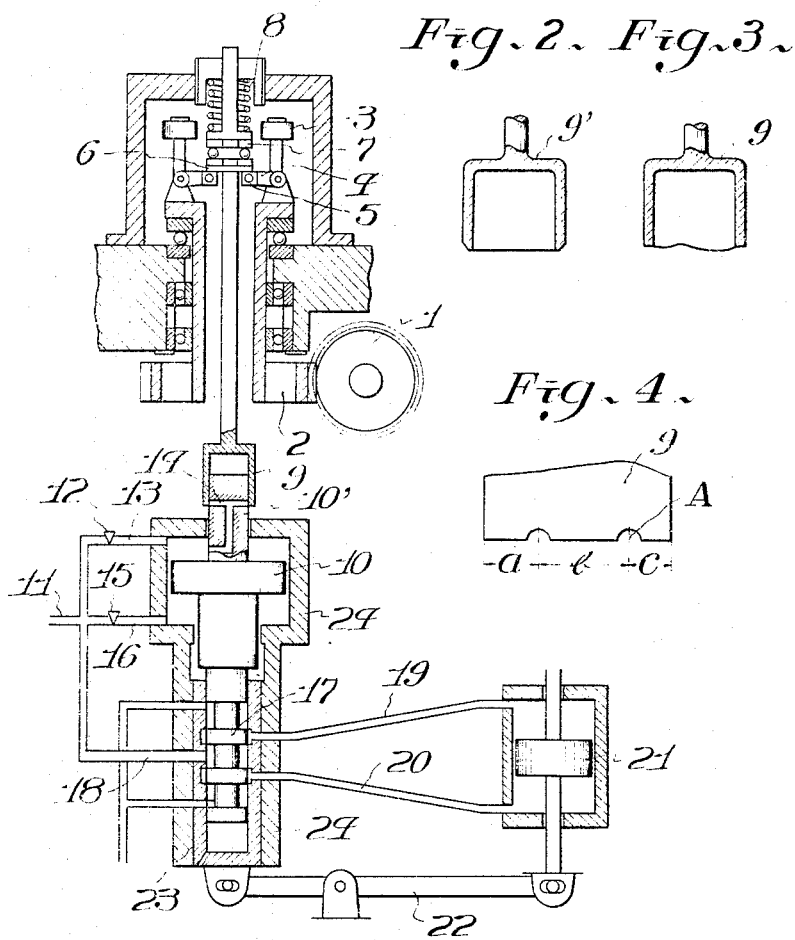
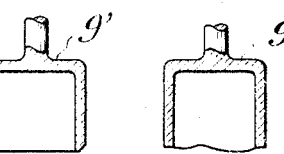
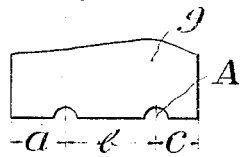

United States Patent Office 3,215,155
Patented Nov. 2, 1965

3,215,155
SPEED GOVERNOR DEVICE HAVING PILOT VALVE STATIC FRICTION PREVENTION MEANS
Asao Oishi, Hitachi-shi, Japan, assignor to Kabushiki Kaisha Hitachi Seisakusho, Tokyo, Japan, a joint-stock company of Japan
Filed Feb. 25, 1963, Ser. No. 260,495
Claims priority, application Japan, Feb. 28, 1962, 37/7,266
1 Claim. (Cl. 137—58)

This invention relates to speed governing devices, particularly to speed governing devices of the type wherein microvibration is imparted to the pilot valve of a servovalve mechanism for a speed governor and machine tool so as to eliminate static friction, thereby improving the operational sensitivity of this pilot valve.

Heretofore, the utilization of electrical microvibrations for the above-stated purpose has been proposed.

It is an object of the present invention to provide a speed governor device so adapted as to impart mechanical microvibrations for the above-stated purpose, thereby greatly improving the operational sensitivity of the pilot valve.

It is another object of the invention to provide a speed governor device in which certain disadvantages inherent in conventional governor devices of similar type, as will be described hereinafter, are eliminated.

It is a further object of the invention to provide a speed governor device as above-stated by which the operational sensitivity of a pilot valve is greatly improved through the utilization of a relatively simple mechanism which can be made compact in volumetric size.

The nature, principles, and details of the invention, as well as the manner in which the foregoing objects thereof may best be achieved will be apparent from the following description of a preferred embodiment of the invention, when taken in conjunction with the accompanying drawing in which like parts are designated by like reference numerals, and in which:

FIGURE 1 is a fragmentary view partly in section and partly in elevation showing the embodiment of the invention;

FIGURE 2 is a fragmentary view, partly in section, showing the configuration of a hydraulic pressure amplifier cap of conventional form; and FIGURE 3 is a fragmentary view, partly in section, showing the configuration of a hydraulic pressure amplifier cap according to the present invention; and FIGURE 4 is an enlarged development of one example of a hydraulic pressure amplifier cap.

Referring to FIGURE 1, the governor section of the device embodying the invention derives its driving power from a prime mover (not shown) through a driving gear 1 and a driven gear 2, which is so coupled as to rotate together with fly weights 3 which are adapted to function in response to centrifugal force. The fly weights 3 are provided with levers 4 coupled to blocks 5, on which a thrust plate 6 rests.

Thus, when the rotational speed of the prime mover varies, the centrifugal force acting on the fly weights varies. When the rotational speed rises, the fly weights 3 are forced outwards, whereby this movement and accompanying force are transmitted through the levers 4 and blocks 5 to raise the thrust plate 6. A downward force due to a spring 8 acts through a thrust bearing 7 on the thrust plate 6 and is in balance with the upward force on the thrust plate 6 due to the centrifugal force acting on the fly weights 3.

In other words, the thrust plate 6 moves vertically with its position in a substantially proportional relationship to the rotational speed of the prime mover. The thrust plate 6 is coupled to a cap 9 in such a manner that the cap 9 is caused to rotate about a vertical axis together with fly weights 3. The cap 9 is disposed to cover the head part of a differential piston rod 10' so as to close or open oil holes 14 provided in the upper part of the piston rod 10'. The piston rod 10' is fixed coaxially to a differential piston 10. Pressure oil is supplied from a pressure oil pipe 11, through a constriction 12 and oil pipe 13 to the cylinder space above the differential piston 10, and one portion of the pressure oil thus supplied is caused to flow out through the oil holes 14. Moreover, pressure oil from the pressure oil pipe 11 is supplied through a constriction 15 and an oil pipe 16 to the cylinder space below the differential piston 10, and the downward force on the piston 10 is balanced by the upward force thereon when the ratio of the oil pressures above and below the piston becomes equal to the inverse ratio of the piston areas on which they act.

That is, when the cap 9 moves upwardly, and the oil hole 14 is opened further, the pressure above the piston 10 decreases, and the balance of forces is disturbed. Accordingly, the differential piston 10 rises and follows up the movement of the cap 9. When the cap 9 descends, the oil hole 14 is closed further, the pressure above the piston 10 increases, and the piston 10 descends.

A pilot valve 17 is connected directly and coaxially to the lower end of the differential piston 10. The vertical movement of the valve 17 causes the oil pressure in a pipe line 18 to be changed-over between a pipe line 19 and a pipe line 20 leading to opposite sides of a servomotor piston 21, which is thereby caused to move downwardly or upwardly. The movement of the servomotor piston 21 is restored through a lever 22 to a sleeve 23 concentrically encompassing the pilot valve 17.

In the conventional construction, the cap 9' is so formed that its part which contacts the oil hole 14 of the differential piston rod 10' is horizontal as shown in FIG. 2 and, unless a small vertical vibration is imparted from the outside, is incapable of applying a small vertical vibration to the differential piston 10. However, in a mechanical-type speed governor, such a small vertical vibration cannot be easily applied and, moreover, is not desirable for reasons due to the construction of the mechanism of the fly weights 3.

The present invention contemplates elimination of the above disadvantage by causing the cap 9 to rotate together with the fly weights 3 and, at the same time, forming the cap 9 so that its part which laps the oil hole 14, that is, its edge, is of a configuration which is not horizontal, as indicated in FIG. 3. FIG. 4 shows a development of one example of such an edge, wherein said edge is notched symmetrically, the positions of the notches being so selected that the distance relationship is $a+c=b$. That is, notches A are provided at two places on the entire circumference.

According to this invention, the combination of the configuration of the cap 9 and the rotation thereof, as described above, causes the notches of the cap 9 to pass by the oil hole 14 of the differential piston rod 10'. When the notch A coincides with the oil hole 14, some of the pressure oil above the differential piston 10 flows out, and the pressure of the above cylinder 10 drops. Consequently, the piston 10 moves upwardly, and the pilot valve 17 also moves upwardly. Then, when the cap 9 rotates, and the oil hole 14 is covered, the differential piston 10 and the pilot valve 17 return to their original positions.

In other words, the pilot valve is caused to undergo up-and-down movements by the existence of the notches (here, the notches A) of the cap 9, and the frequency of these extremely small vertical movements can be determined by the number of notches on the periphery of the edge of the cap 9 and its rotational speed. Furthermore, it is possible to determine suitably, the vibrational amplitude by suitably selecting the depth (or height) of the notches.

The application of the above-described microvibration has the following beneficial effect. The static friction between the head part of the differential piston and the cap 9 can be greatly reduced by the rotation of the cap 9 and by the up-and-down motion of the piston 10. Furthermore, the static friction between the differential piston 10 and the cylinder body 24 and between the pilot valve 17 and the sleeve 23 can be reduced. As a result the operational sensitivity of the pilot valve 17 can be substantially increased. Moreover, the diameter of the differential piston can be made small, whereby the construction of the entire mechanism can be made compact.

Although the present invention has been described in conjunction with a particular, preferred embodiment thereof, it is to be understood that modifications and variations may be resorted to therein without departing from the spirit and scope of the invention, as those skilled in the art will readily understand, and such modifications are to be considered to be within the purview and scope of the invention and appended claim.

What is claimed is:

In a mechanism including a pilot valve and means for imparting microvibration to said pilot valve to eliminate static friction, a speed governor device comprising a driving gear adapted to be driven by a prime mover, a driven gear driven by said driving gear, fly weights operably coupled with and caused to rotate by said driven gear, a thrust plate adapted to rotate together with said fly weights and move vertically in response to variations in the rotational speed of the speed governor in the centrifugal force imparted to said fly weights, a cap of inverted cup shape coupled to the thrust plate and moving with vertical movements and rotation of the thrust plate, said cap having a free edge provided with spaced notches, a differential piston rod having its upper end encompassed by said cap, a differential piston and a pilot valve below said piston rod, and said piston rod having an oil passage therein with one end opening into a cylinder space of the differential piston, and the other end provided with an opening so located as to be opened and closed by the notches and edge of the cap between the notches, respectively.

References Cited by the Examiner

UNITED STATES PATENTS

| 655,608 | 8/00 | Cooper | 137—33 XR |
| 685,510 | 10/01 | Flint | 137—33 XR |
| 1,234,882 | 7/17 | Doble | 137—58 XR |
| 2,646,813 | 7/53 | Mueller | 137—58 |

FOREIGN PATENTS

| 2,214 | 1860 | Great Britain. |

ISADOR WEIL, *Primary Examiner.*

CLARENCE R. GORDON, *Examiner.*